United States Patent Office 3,075,919
Patented Jan. 29, 1963

3,075,919
PROCESS FOR THE PRODUCTION OF ACICULAR GAMMA-IRON (III) OXIDE
Josef Gruber, Heidelberg, Karl Wintersberger, Ludwigshafen (Rhine), Germany, assignors to Badische Anilin- & Soda - Fabrik Aktiengesellschaft, Ludwigshafen (Rhine), Germany
No Drawing. Filed Aug. 18, 1960, Ser. No. 50,304
Claims priority, application Germany Aug. 21, 1959
3 Claims. (Cl. 252—62.5)

This invention relates to an improved method for the production of acicular γ-iron (III) oxide which is especially suitable for magnetogram carriers.

In the production of sound carriers for magnetographic sound recording and reproduction, special significance attaches to the particle structure of the ferromagnetic iron oxides used. Experience has shown that $\gamma$-$Fe_2O_3$ prepared from acicular ferric hydroxide has better magnetic values, expressed in terms of coercive force and remanence, than cubical $\gamma$-$Fe_2O_3$ prepared by way of precipitating magnetite.

Iron oxide yellow (FeOOH) which can be used as a starting material for the production of magnetogram carriers and has hitherto been the sole representative of iron oxides known to consist of acicular particles, is prepared in known manner by oxidizing metallic iron with air in the presence of an aqueous suspension of iron oxide yellow nuclei at an elevated temperature and while maintaining an acid reaction medium.

The nuclei introduced are, in turn, obtained from iron (II) hydroxide by oxidation with air at 20° to 40° C. in a neutral to weakly acid medium. The quality of the FeOOH thus obtained is often subject to considerable variation which is caused by slight influences not determinable individually and which makes it difficult to work up the FeOOH to $\gamma$-$Fe_2O_3$ of uniform magnetic properties.

We have found that acicular $\gamma$-$Fe_2O_3$ of excellent and definite magnetic properties can be prepared by precipitating iron (III) hydroxide from a solution of an iron (III) salt with an alkaline solution applied in excess of the stoichiometrical amount at temperatures between about 10° and 50° C., preferably between 25° and 35° C., and while stirring vigorously, and treating the precipitated and washed iron (III) hydroxide for several hours with a strongly alkaline solution at temperatures of about 20° to 90° C. The iron (III) hydroxide is then heated, if desired under pressure, to higher temperatures, preferably to temperatures in the neighbourhood of the boiling point of the strongly alkaline solution, filtered off, washed and dried. The dried iron (III) hydroxide is then converted with reducing gases into iron (II)-iron (III) oxide and the latter oxidized with oxygen-containing gases to γ-iron (III) oxide. Especially suitable iron (III) salts include the chloride, nitrate and sulfate. Preferred basic agents for the precipitation of the iron (III) hydroxide include the hydroxides and carbonates of sodium and potassium, and ammonia. The excess of basic agent over the stoichiometrical amount is preferably more than 100%. The solution of the iron (III) salt to be precipitated should not be too highly concentrated. The most favorable concentrations are from about 0.7 to 1.5 mols per liter. The concentration of the basic precipitant is preferably kept between about 1.6 and 2.4 mols per liter.

The iron (III) hydroxide gel prepared in this manner is deposited completely and very rapidly and can be washed very easily and thoroughly by decanting the solution about 3 or 4 times. Recovery of the iron (III) hydroxide gel can therefore be carried out rapidly even on a large scale.

For the treatment of the washed iron (III) hydroxide gel with strongly alkaline solutions, the iron (III) hydroxide gel is preferably stirred with concentrated caustic soda solution or caustic potash solution in such an amount that the suspension contains about 3 to 20% of the caustic solution. This suspension is kept at a constant temperature within the range of about 20° to 90° C. for about 10 to 40 hours, preferably in a thermostat, while stirring. Then the temperature is raised to within the neighbourhood of the boiling point of the alkaline solution, if desired under pressure, and the suspension is kept at this elevated temperature for about 1 to 3 hours.

The iron (III) oxides thus obtained, which are yellow, orange or red-brown according to the reaction conditions, are readily filtered and washed. They consist of slender, well-developed needles about 0.3 to 3 microns in length. The length of the needles depends on the reaction conditions in that it increases with rising temperature and/or concentration of the alkaline solution. Increased temperatures at the same time cause a growth in needle thickness.

After drying, the iron (III) oxide is heated in a stream of reducing gas, such as carbon monoxide, hydrogen, illuminating gas or the like, and reduced to $Fe_3O_4$ (magnetite). Owing to the extremely fine particle structure of the iron (III) oxide, the reduction may be carried out very carefully at temperatures below 400° C., preferably at 270° to 300° C., whereby magnetic properties are obtained which are more favorable than those of products which require reduction at higher temperatures. Special importance should be attached to slow heating up and to even temperature control. After cooling in a stream of nitrogen, the magnetite, which is practically not autoxidizable, is carefully oxidized to $\gamma$-$Fe_2O_3$ by means of air or oxygen-containing gases at temperatures of up to about 400° C., especially at 180° to 200° C. The coercive force of the resultant $\gamma$-$Fe_2O_3$ is 340 to 360 oersteds, the remanence value is 480 to 600 gausses.

As compared with the known improvement of the magnetic properties of cubical precipitated magnetite by preparation of the same from, for example, solutions containing cobalt ions, the magnetic properties of acicular iron (III) oxides prepared by the process according to the present invention can be influenced to a considerably greater extent by the uniform incorporation of foreign metal ions into the crystal lattice of the oxides. For this purpose, the foreign metal ions, which may belong to various groups of the periodic system, as for example compounds of cobalt, nickel, copper, manganese, cadmium and chromium, may be added to the solution of the iron (III) salt and the solution may be further treated as described above. When the solution of iron (III) salt containing the foreign metal ions is dripped into the basic medium applied, immediate and simultaneous precipitation of the hydroxides of the iron and the added foreign metal as well as uniform incorporation into the lattice of the acicular $\gamma$-$Fe_2O_3$t o be prepared by further working up are effected. The percentage of foreign metal in the $\gamma$-$Fe_2O_3$ is usually adjusted to up to 5% and, in special cases, to up to 10%. By incorporating, for example, as little as 1.7% of cobalt into acicular $\gamma$-$Fe_2O_3$, a coercive force of 450 oersteds is obtained.

By suitable modification of the reaction conditions of the process according to the present invention, γ-iron (III) oxides with predictably varying properties can be prepared in a reproducible manner and the electro-acoustic properties of magnetic recording tapes prepared therewith can thus be influenced as desired for the particular purpose.

The products prepared according to the present invention are also suitable for use as adsorption agents, for example in chromatography, and also as pigments and catalysts.

The following examples will further illustrate this invention, but the invention is not restricted to these examples.

Example 1

In the course of 45 minutes and while stirring vigorously, a solution of 250 grams of sublimed $FeCl_3$ in 1.5 liters of water is dripped into a solution of 500 grams of $Na_2CO_3$ in 2.5 liters of water contained in a tall 10 liter vessel. The temperature of both solutions is kept at 30° C. After the reaction has ended, the whole is stirred for another 15 minutes, the precipitation vessel is filled up with water and after about one hour the mother liquod standing above the iron hydroxide (which has settled to a volume of about 0.6 liter) is filtered off by suction. In this manner, the precipitate is washed four times altogether by decantation, and then 340 grams of a 50% KOH solution are added. The suspension which has been made up to a total volume of 1.5 liters and transferred into a 3 liter flask is placed in a thermostat of 50° C. and stirred for 15 hours. Finally, it is heated to 100° C. and this temperature is maintained for 2 hours. The light-brown reaction product is filtered off, washed thoroughly and dried at 120° C. Reduction to $Fe_3O_4$ is carried out in a rotating 1 liter flask through which CO is led in an amount of 15 liters per hour. The flask is heated to 270° to 280° C. in the course of 60 to 75 minutes. The iron oxide begins to turn back and, after the temperature has been slowly raised to 290° to 300° C., reduction to magnetite is complete after about 45 to 50 minutes. After cooling to room temperature in a stream of nitrogen, 20 liters of air per hour are led into the flask and the temperature is slowly raised to 190° C. in the course of 60 to 90 minutes. After about 60 minutes, the $Fe_3O_4$ has oxidized practically quantitatively to $\gamma$-$Fe_2O_3$.

The product thus obtained has a coercive force ($H_c$) of 350 oersteds and a remanence ($B_r$) of 540 gausses.

Example 2

In the manner described in Example 1, 250 grams of sublimed $FeCl_3$ and 10 grams of $CoCl_2.6H_2O$ dissolved in 2.0 liters of water are dripped, in the course of one hour, into 2.5 liters of a 20% soda solution at 25° C., while stirring vigorously. The precipitate is washed thoroughly by decanting four times, 290 grams of a 50% caustic potash solution are added to the suspension and the total volume is made up to 1.5 liters. After stirring for 20 hours at 35° C., the whole is refluxed for 2 hours, the brown reaction product is filtered off and washed thoroughly. After drying, it is worked up to magnetite and $\gamma$-$Fe_2O_3$ in the manner described in Example 1. The $\gamma$-$Fe_2O_3$ thus obtained has a coercive force ($H_c$) of 455 oersteds and a remanence ($B_r$) of 580 gausses.

We claim:
1. A process for the production of acicular gamma-iron (III) oxide which comprises precipitating iron (III) hydroxide from a solution of an iron (III) salt selected from the group consisting of iron (III) chloride, iron (III) nitrate and iron (III) sulfate with a solution of a compound selected from the group consisting of sodium hydroxide, potassium hydroxide, sodium carbonate, potassium carbonate and ammonia, said compound being applied in an excess of at least 100% over the stoichiometric amount, while stirring vigorously, at temperatures between 10° C. and 50° C., separating the iron (III) hydroxide thus obtained, treating it for several hours with a caustic solution having a concentration of about 3 to 20% of alkali metal hydroxide at temperatures of 20 to 90° C. and then heating to temperatures higher than 90° C. up to temperatures near the boiling point of said caustic solution, filtering, washing and drying it, heating the dried iron (III) oxide in a stream of a reducing gas at temperatures below 400° C. to reduce the iron (III) oxide to magnetite, and oxidizing said magnetite to gamma-iron (III) oxide with a gas containing free oxygen at temperatures up to about 400° C.

2. The process of claim 1 wherein the temperature at which the iron (III) oxide is reduced to magnetite is in the range of 270–300° C. and the temperature at which the magnetite is oxidized to gamma-iron (III) oxide is in the range of 180–200° C.

3. A process as claimed in claim 1 wherein the iron (III) hydroxide is precipitated from an iron (III) salt solution containing foreign metal ions selected from the group consisting of cobalt, nickel, copper, manganese, cadmium and chromium in such an amount that the acicular $\gamma$-iron (III) oxide prepared therefrom contains up to 10% of the said foreign metal.

References Cited in the file of this patent
UNITED STATES PATENTS

| | | |
|---|---|---|
| 1,547,624 | Smith et al. | July 28, 1925 |
| 2,079,602 | Crist | May 1, 1937 |
| 2,333,672 | Oliver et al. | Nov. 9, 1943 |
| 2,419,240 | Wilson | Apr. 22, 1947 |
| 2,560,970 | Martin | July 17, 1951 |
| 2,871,116 | Clark | June 27, 1959 |
| 2,900,236 | Speed et al. | Aug. 18, 1959 |
| 2,939,767 | Martin | June 7, 1960 |

OTHER REFERENCES

Mellor: "Comprehensive Treatise on Inorganic and Theoretical Chemistry," Longmans, Green & Co., New York, vol. 13, pt. 2 (1934), pages 859 to 889 (pages 859, 860, 861, 862, 874 and 878 particularly relied on).

UNITED STATES PATENT OFFICE
CERTIFICATE OF CORRECTION

Patent No. 3,075,919 January 29, 1963

Josef Gruber et al.

It is hereby certified that error appears in the above numbered patent requiring correction and that the said Letters Patent should read as corrected below.

Column 3, line 12, for "liquod" read --- liquor ---; line 28, for "back" read --- black ---.

Signed and sealed this 1st day of October 1963.

(SEAL)
Attest:

ERNEST W. SWIDER

Attesting Officer

DAVID L. LADD
Commissioner of Patents